United States Patent
Schulte et al.

[11] Patent Number: 5,950,562
[45] Date of Patent: Sep. 14, 1999

[54] APPARATUS FOR AND A METHOD OF MANAGING ANIMALS

[75] Inventors: Klaus Schulte, Molnbo; Jan Stein, Alvsjo; Benny Ornerfors, Jarfalla, all of Sweden

[73] Assignee: Alfa Laval Agri AB, Tumba, Sweden

[21] Appl. No.: 08/860,461

[22] PCT Filed: Dec. 22, 1995

[86] PCT No.: PCT/SE95/01568

§ 371 Date: Jun. 25, 1997

§ 102(e) Date: Jun. 25, 1997

[87] PCT Pub. No.: WO96/19917

PCT Pub. Date: Jul. 4, 1996

[30] Foreign Application Priority Data

Dec. 28, 1994 [SE] Sweden ................................... 9404538
Dec. 28, 1994 [SE] Sweden ................................... 9404540
Dec. 28, 1994 [SE] Sweden ................................... 9404541

[51] Int. Cl.[6] ...................................................... A01K 1/00
[52] U.S. Cl. ...................... 119/51.02; 119/518; 119/843
[58] Field of Search ............................ 119/14.02, 51.02, 119/518, 520, 521, 667, 843

[56] References Cited

U.S. PATENT DOCUMENTS

| 3,301,215 | 1/1967 | Shakarian | 119/14.02 |
| 4,580,529 | 4/1986 | Wilson | 119/666 X |
| 5,195,455 | 3/1993 | van der Lely et al. | 119/51.02 X |
| 5,469,808 | 11/1995 | Street et al. | 119/14.03 X |

FOREIGN PATENT DOCUMENTS

| 189954 | 8/1986 | European Pat. Off. |
| 617887A2 | 10/1994 | European Pat. Off. |
| 622019A1 | 11/1994 | European Pat. Off. |
| 634097A1 | 1/1995 | European Pat. Off. |
| 635203A2 | 1/1995 | European Pat. Off. |
| 9419931 | 9/1994 | WIPO |

Primary Examiner—Robert P. Swiztek
Attorney, Agent, or Firm—Hovey, Williams, Timmons & Collins

[57] ABSTRACT

An apparatus for managing animals, having a stall, such as a milking stall with an automatic milking machine. The stall comprises an entrance and an exit and is provided for housing one single animal. One or more enticing devices are provided to entice the animal to approach or to leave the stall.

57 Claims, 10 Drawing Sheets

APPARATUS FOR AND A METHOD OF MANAGING ANIMALS

BACKGROUND OF THE INVENTION

1. Field of the Invention

In a first aspect the present invention relates to an apparatus for managing an animal, comprising a stall having an entrance and an exit and provided for housing one single animal. Furthermore, the present invention in the first aspect relates to a method of automatically managing an animal in a stall.

In a second aspect, the present invention relates to an apparatus for enticing an animal to move towards a predetermined destination, comprising an animal enticing means.

In a third aspect the present invention relates to an apparatus for enticing an animal of a herd to move in a desired direction. Furthermore, the present invention in the third aspect relates to a method of enticing an animal to move in a desired direction.

2. Description of the Prior Art

Automatic milking of cows is disclosed in EP-A-91 892. The automatic milking takes place in one or more combined feeding and milking stalls provided in a barn in which the animals are allowed to walk about freely and find their way individually to the stalls for feeding, drinking and milking. The cows are automatically identified in each stall and fed with the aid of a computer connected to the identification and feeding means used. By means of the computer, in which facts concerning each cow, when she was last milked, etc are stored, automatic milking is initiated. The stall also comprises retaining gates which are automatically closed to retain the cow during milking and opened to let the cow leave the stall.

Traditionally cows are milked twice a day. Because of high labour costs it was not interesting to increase the number of milkings per day as long as milking was performed manually. It is however recognized that milking a cow three to four times a day has proved to be of less detriment to her, since the udder is not filled to its maximum between each milking. Such a milking procedure corresponds more closely to the behaviour of the calves and therefore results in healthier cows. As a side effect, however, it is possible to increase the total milk production from one cow by 15–25%. By means of automatic milking machines it is not only possible, but would also be economically interesting to milk the cows more often than twice a day, since the labour costs are not any longer critical. In this case it is rather the high investment cost which is a limiting factor. Therefore, in order to reach a high utilization of the capacity of such automatic milking machines and in order to obtain such a high milking frequency by a reasonable number of automatic milking stations, it is necessary to rapidly get the cow into the milking station where automatic milking can take place. Moreover, once the cow has been milked she must as soon as possible leave the milking station in order to give access to another cow. Furthermore, when a cow enters the milking station it is also essential that she leaves the milking station as soon as possible, if she for the moment should not be milked. This is the case if a cow enters the milking station although she was just milked, if her udder and the teats are dirty to such an extent that she must be cleaned and dried before she can be milked, in order not to contaminate the milk.

Thus, in connection with automatic milking it is important that the cow immediately leaves the milking station after finished milking.

In the past, different proposals have been raised to this end. One is to divide the cows into groups which necessitates partitions and gates and, hence, reduces the accessible area for each individual cow. Another proposal is to force the cows to a milking station by different signals and electric fences, see e.g. EP-A-582 350, EP-A-566 201, EP-A-567 191 or EP-A-189 954. DE-A-4 134 163 proposes to force the animals by means of pressurized air. It has also been proposed to drive the animals to a desired area by means of movable gates of different types. However, animals are sensitive living beings and in most cases react very negatively to forces of any kind.

DE-C-3 702 465 discloses a system for automatic milking and feeding of cows, whereby the cows, when finding their way to a feeding stall, are forced to pass an identifying device. Thereafter the cows are led to a milking stall for automatic milking or alternatively to a feeding station having no milking machine.

EP-A-617 887 discloses a construction for milking animals, comprising a milking box, one or more milking robots and a control room. From the exit of the milking box, the animal may enter an area in which a sufficient quantity of fodder is available.

There is no means proposed to remind the animal in an active manner that she is to leave the milking box after milking.

SUMMARY OF THE INVENTION

The main object of the present invention is to improve the efficiency in animal management.

In one aspect of the present invention the object is to bring the animal to enter voluntarily and leave a stall without delay and thereby speed up the animal traffic through said stall.

In other words the object of the present invention is to provide an efficient apparatus, which entices the animal to move voluntarily to a predetermined destination without delay.

In still other words the object of the present invention is to make an animal move in a desired direction so that the animal arrives at a predetermined destination, and more specifically to entice the animal to find voluntarily its way to a milking station without delay.

Furthermore, the present invention resides in the insight that the animals should not be forced by physical or other means, but be enticed and encouraged to behave in a certain way, and that such a way of leading the animals is more efficient in the long run. It results in animals being more satisfied with their situation and consequently they will produce more milk. By implementing the present invention in connection with a stall for treatment of the animal, e.g. treatment such as milking, massageing, cleaning, insemination, administrating medicine etc., a procedure is obtained, which will be a positive experience for the animal. This is very important, and since many animals, especially cows, have a very good memory, they will always look forward to the next treatment opportunity, rather than being afraid thereof.

These objects are obtained by the apparatus for managing an animal, which is initially defined and characterized by an exit area accessible to the animal from the exit of the stall, and by enticing means provided to entice the animal to move from the stall into the exit area.

By forming the enticing means such that it is activatable from a rest state, the behaviour of the animal may be controlled in a very careful manner. To this end control means may be provided, by which different enticing devices may be activated. With the aid of the control means for activating the enticing devices, the enticing method can be varied and even adapted to the preferences of different animals, i.e. one or more of the enticing devices, which by experience have proved to entice efficiently an individual animal to leave the stall, may be activated.

By the use of one or more of various enticing devices, such as a water supply device, a feeding device, a cleaning device, air spraying device, a dressing device, a smell spreading device, and a sound generating device, the likelihood that the animal voluntarily leaves the milking stall without delay is considerably increased.

The result of the examination to be performed by the examination device provided in the stall may be processed by the control means to either activate treatment of the animal, e.g. a milking machine, or to activate any of the enticing devices. Furthermore, this result may be processed to open or close the gates.

By defining the exit area by a stall, the animal can be left alone to drink water, to be fed, to be cleaned etc, and other animals can be prevented from entering the exit area from outside the milking station.

The objects defined are also obtained by a method of automatically managing an animal in a stall, comprising the following steps:
  identifying the individual animal entering the stall;
  examining the condition of the identified animal;
  treating the identified animal in response to the result from the condition examination, and
  enticing the animal away from the stall.

Furthermore, these objects are obtained by an apparatus according to the second aspect and initially defined, which is characterized in that said animal enticing means comprises a plurality of enticing devices arranged at different locations and adapted to be activated independently of one another, a sensing means for sensing the presence of said animal comprising a plurality of sensing devices in an area where the animal resides, wherein at least one sensing device of said plurality of sensing devices sensing the presence of the animal is adapted to activate at least one of said plurality of enticing devices, for enticing the animal to move towards said enticing device, thereby leading the animal along a route leading to said destination. Hereby, the animal is efficiently enticed to move towards a desired destination.

Preferably, a further sensing device, located on said route closer to said predetermined destination than said one sensing device, is adapted to activate a further enticing device located on said route closer to said predetermined destination than said one enticing device. Hereby is achieved that the animal is enticed step by step towards said destination.

According to a first embodiment, said enticing device is a smell generating device. Hereby the animal is enticed by stimulating its olfatory sense.

According to a second embodiment, said enticing device is a water supply, such as a water bowl. Hereby, the animal is enticed by using its need for liquid.

According to a third embodiment, said enticing device is a feed supplying device, such as a feed trough. Hereby the animal is enticed by using its need for food or by stimulating its sense of taste.

According to a fourth embodiment, said enticing device is a light emitting device, such as a spotlight. Hereby, the animal is enticed by using its inherent curiosity in connection with its other needs and senses, since, when feed is lit up by means of a spotlight, the animal is firstly curious to see what is lit up, secondly, its need for water, feed or the like will be satisfied.

According to a fifth embodiment, said enticing device is a sound generating device, such as a loudspeaker. Hereby, the animal is enticed by stimulating its auditory sense with an agreeable sound, such as feed falling into a feed trough, which is immediately recognizable by the animal.

Preferably, the enticing unit is adapted to be activated substantially in front of the animal, seen in the direction of movement of the animal. Hereby is achieved that the animal is enticed to move towards said destination.

Preferably, said predetermined destination is a milking station. Alternatively, said apparatus further comprises a milking station, wherein said predetermined destination is located outside said milking station. Hereby, the animal is brought to enter voluntarily and move away from the milking station without delay and thereby to obtain a high degree of milked animals per unit of time. Accordingly, the efficiency in milking, in particular automatic milking, will be improved.

Suitably, said predetermined destination is a treatment stall. Alternatively, said apparatus further comprises a treatment stall, wherein said predetermined destination is located outside said treatment stall. Hereby, the animal is brought to enter voluntarily and leave the treatment stall without delay and thereby a high degree of treated animals per unit of time is obtained. Accordingly, the efficiency in treatment of animals is improved.

Preferably, the apparatus further comprises a pathway defined by side movement delimiting means, such as walls or bars. Hereby is achieved that the animal is enticed to move to said predetermined destination more efficiently, since once the animal has entered the pathway other perceptions will no longer disturb the animal.

Suitably, said sensing means comprises an identification means to be associated with said animal and a reading means responsive to a signal from said identification means. Hereby is achieved that each animal may be identified, so that it can be determined whether an identified animal should be enticed to move towards said destination or not.

Furthermore, these objects are obtained by the apparatus according to the third aspect and initially defined, which is characterized in that it comprises a plurality of supply units for dispensing edible products, such as feed or water, to the animal, arranged at different locations along said direction, each supply unit being provided with a sensing means for sensing the presence of said animal, and control means for controlling the supply units in response to said sensing means sensing the presence of the animal to dispense the edible products with varying dispensing intensity to the animal in various supply units, such that the animal is enticed to seek for edible products in said desired direction.

Furthermore, these objects are obtained by the method according to the third aspect and initially described, which is characterized by dispensing edible products, such as feed or water, to the animal in supply units at different locations along said directions; sensing the presence of the animal at said supply units; and controlling said supply units in response to sensed presence of the animal, such that the edible products are dispensed with varying intensity to the animal in various supply units to entice the animal to seek for edible products in said desired direction.

Preferably, said direction leads to a predetermined destination, said supply units being arranged at different distances from said destination, said control means being adapted to control the dispensing intensity such that edible products are dispensed in a relatively low dispensing intensity to the animal by supply units located relatively remote from said destination, in order to entice the animal to seek for edible products dispensed by supply units closer to said destination. Hereby, the animal is enticed to move towards said destination.

Advantageously, said control means is adapted to control the dispensing intensity such that edible products are dispensed to the animal with a relatively high intensity by supply units located relatively close to said destination. Hereby, the animal is enticed even more to move towards said destination.

Suitably, said control means is adapted to control the supply units such that the dispensing intensity increases with decreasing distance between a supply unit and said destination.

Preferably, said destination is a milking station. Hereby, it is possible to entice the animal to move to an automatic milking machine when she needs to be milked.

Alternatively, said direction leads away from a restricted area, said supply units being arranged at different distances from said restricted area, said control means being adapted to control the dispensing intensity such that edible products are not dispensed at all or are dispensed with relatively low intensity by supply units located relatively close to the restricted area in order to entice the animal to seek for edible products dispensed by supply units farther away from said restricted area.

Preferably, said control means is adapted to control the dispensing intensity such that edible products are dispensed to the animal with a relatively high intensity by supply units located relatively remote from said restricted area. Hereby, the animal is enticed even more to move away from said restricted area.

Moreover, said control means is adapted to control the supply units such that the dispensing intensity increases with increasing distance between a supply means and said restricted area.

Advantageously, said restricted area is a milking station. Hereby, it is possible to entice the animal to move away from an automatic milking machine when it does not need to be milked.

Advantageously, each supply unit is adapted to dispense rations of the edible products of different sizes, such that a small ration corresponds to a low dispensing intensity, whereas a large ration corresponds to a high dispensing intensity.

Alternatively, each supply unit is adapted to dispense the edible products with different speeds, such that a small dispensing speed corresponds to a low dispensing intensity, and a high dispensing speed corresponds to a high dispensing intensity.

Preferably, each supply unit comprises at least one feed supply unit, and said edible product comprises feed. Hereby, feed in the form of concentrate, roughage, silage or the like may be dispensed to the animal.

Suitably, each supply unit comprises at least one water supply unit, and said edible product comprises water. Hereby, fresh drinking water may be supplied to the animal.

Preferably, said sensing means comprises a reading means responsive to an identification means to be associated with each animal for the identification thereof. Hereby, it is possible to identify individuals of a flock or herd or animals.

The invention is however not limited to animals to be milked. On the contrary, the invention also resides in the insight that living beings may be enticed by impressions of their senses, to take a route desired by the cattleman or the like.

BRIEF DESCRIPTION OF THE DRAWINGS

Preferred embodiments of the present invention will now be described with reference to the accompanying drawings in which.

DESCRIPTION OF PREFERRED EMBODIMENTS OF THE INVENTION

Figure 1:
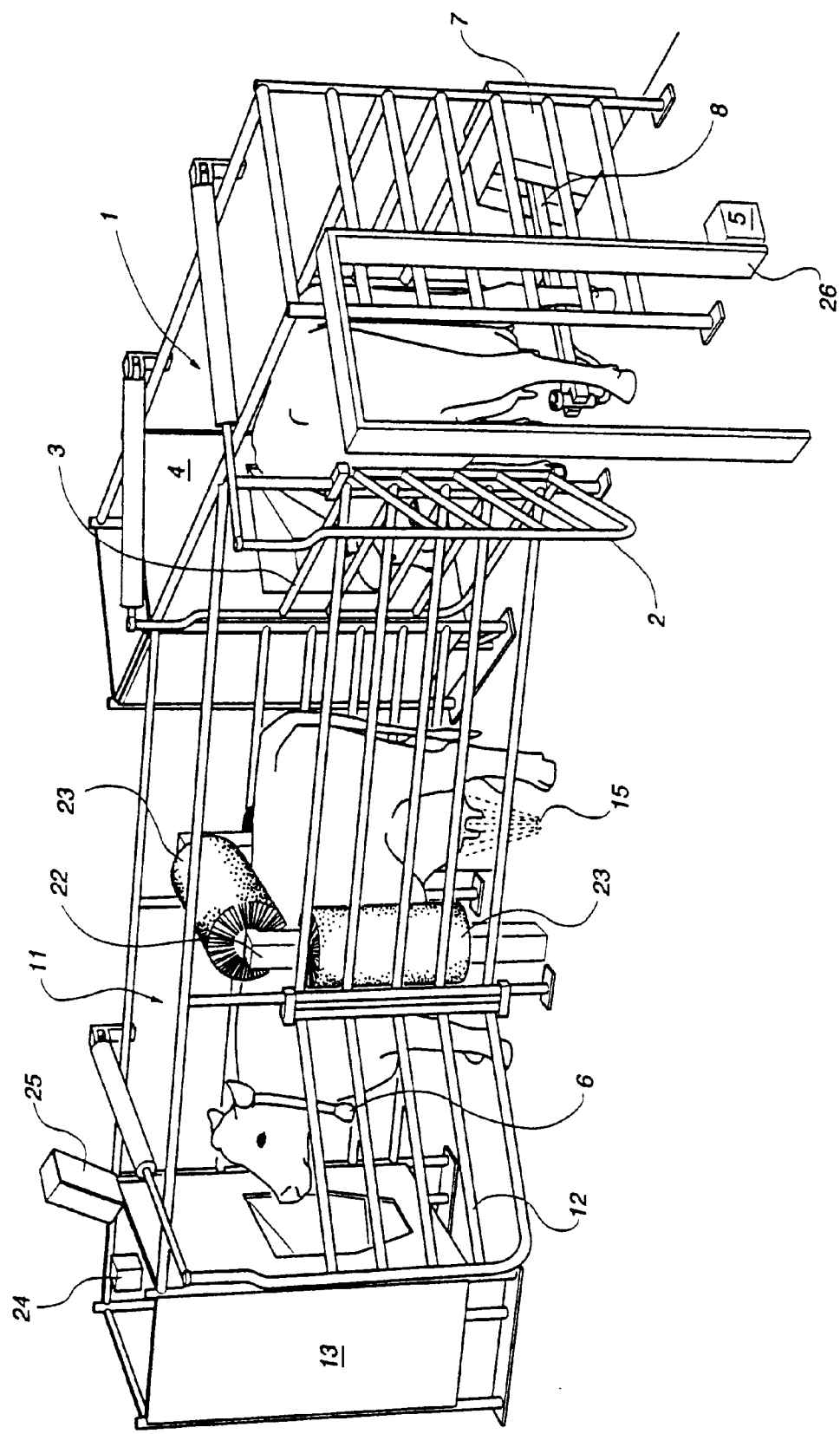
FIG. 1 shows a perspective view of a milking station.
Figure 2:
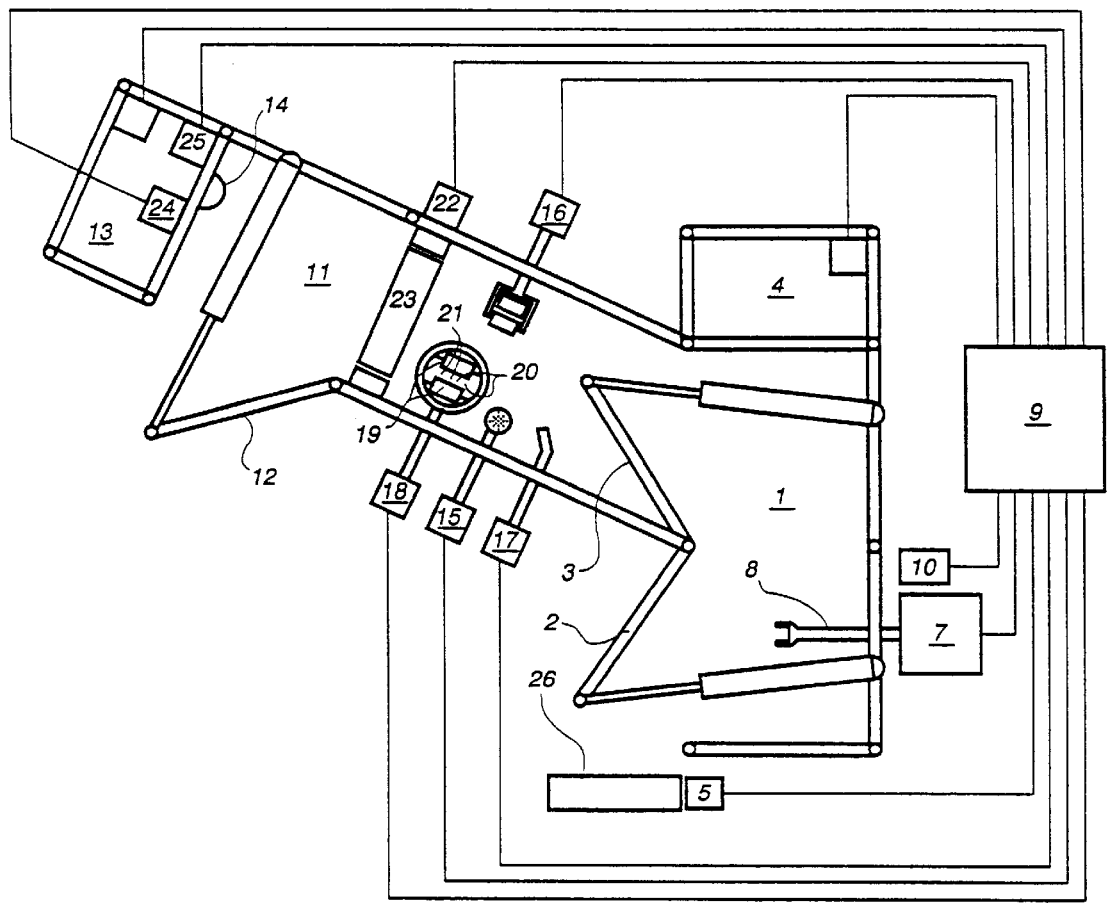
FIG. 2 shows a schematical view from above of the milking station of FIG. 1.

Referring to the FIGS. 1 and 2, a milking station M comprises a milking stall 1 having an entrance gate 2 and an exit gate 3. In the milking stall 1, there is provided a feeding device 4 for feeding the animal during milking, e.g. with concentrate or silage. At the entrance of the milking stall 1 an identification device 5 is provided, which identifies an animal with the aid of a transponder 6 carried by the animal entering the stall 1. The milking stall 1 is provided with an automatic milking machine 7 which may include a sensor (not shown) for determining the position of the teats and which comprises a robot arm 8 supporting the milking cluster including the teat cups to be applied to the teats of the animal. In connection with the automatic milking machine 7 there is also provided a control device 9 and an examination device 10. The function of the control device 9 and the examination device 10 will be explained further below.

Outside the exit gate 3 there is provided a treatment stall 11 which the cow must pass after leaving the milking stall 1. The exit gate 3 of the milking stall constitutes the inlet gate of the treatment stall 11. Moreover, the treatment stall 11 comprises an exit gate 12 of the type which suitably but not necessarily can be opened by the animal itself or it may be of a type which is controlled by the control means 9 in response to data regarding the animal identified as being present in the treatment stall.

In the treatment stall 11 there is provided enticing means comprising various enticing devices for enticing the animal to move from the milking stall 1 into the treatment stall 11, when milking is finished or when the animal should leave the milking stall 1 for some other reason. There are a great number of possibilities to design the enticing devices. The following list comprises many such possiblities but it is, however, not complete.

First of all, in the treatment stall 11 there is provided a supply means 13, which can offer the animal feed in the form of e.g. concentrate or silage from a feed supply device 13a as well as fresh drinking water from a water supply device 14. The supply device 13 may be prepared in advance, such that the animal knows that when it enters the treatment stall 11 there is always something to eat or drink. This is believed to have an enticing effect on the animal, in particular if feed is no longer offered in the feeding device 4 in the milking stall 1. Another possibility is to entice the animal to move from the milking stall 1 by the sound which is generated by the supply of e.g. concentrate or silage from a food dispenser of the feed supply device 13a, or of fresh water from the water supply device 14.

The enticing means also comprises a cleaning device 15, 16 in the treatment stall 11. Such a device 15 may comprise means for spraying warm water on to the udder and the teats of the animal. This could be necessary for reasons of cleanness, but is also something which the animal finds agreeable. Another possibility is to provide a device 16 for mechanical cleaning of the teats and the udder. The latter is advantageous because the teats and the udder do not need to be dried afterwards, but the animal can return to the milking station M immediately. Moreover, the enticing means may comprise a device 17 for spraying warm air on the animal, in particular on the udder and its teats. This will dry the animal, e.g. after cleaning, and give it a positive feeling. Other cleaning devices are also possible, e.g. a combination device 18 comprising rotating brushes 19 for mechanically cleaning and massageing of the teats, spray nozzle devices 20 for delivery of a cleaning agent, and one or more nozzle devices 21 for delivery of drying air to the teats. If the animal has been milked in the milking stall 1, the teats may be sprayed with iodine solution, such as Alfa-Blue®, in order to prevent bacteria entering the opening of the teats of the animal.

Furthermore, a dressing device 22 is provided in the treatment stall 11. This comprises one or more motor-driven, rotating brushes 23 for dressing and massaging the body of the animal.

The mere existence of a cleaning or dressing device is believed to have an enticing effect on the animal. If a stronger enticing effect is needed, the activation of these devices, e.g. starting the motor of the rotating brushes, will entice the animal to move further to the treatment stall 11.

The enticing means also comprises a smell generating device 24 provided in the treatment stall 11, which is adapted to spread smelling substances attractive to the animal, e.g. in the case that the animal is a cow it may be the smell of a bull.

Since many animals are attracted by music, it is also possible to provide a sound generating device, e.g. a loudspeaker 25, in the treatment stall 11 to entice the animal to move from the milking stall 1 to the treatment stall 11.

It is to be understood that these enticing devices may be used separately or in a combination with anyone or several of the others. By means of the control device 9, which may be a computer, the desired enticing device can easily be activated. This can be done in accordance with a predetermined scheme or rule. Because the identification device 5 has provided a signal to the computer 9, which animal is present in the milking stall 1, it is also possible to activate the enticing devices corresponding to the preferences of this particular animal.

A self-adapting control system would also be possible, i.e. the computer 9 can every time an animal enters the stall 1 register how it reacts on different enticing devices, e.g. by measuring the time for the animal to leave the milking stall 1. The result of such measurements could be used in automatically determining the preferences of each individual cow. Such measurements could also be extended to consider the reaction of the cow on varied use of a single enticing device, e.g. different pieces of music from the loudspeaker 25.

It is believed that the enticing devices proposed will attract the animals to leave the milking stall 1 when desired. Moreover, the animals, due to their memoring capacity, will all the time be aware of the existence of the enticing devices. However, it is advantageous if the enticing device is provided in such a manner, that its activation, e.g. by means of the computer 9, will provide a physical signal, such as in the form of a sound, a smell etc., to the animal, making it aware of the existence of the enticing device. Consequently, the animals will be encouraged to enter the milking stall 1 voluntarily.

Figure 3:
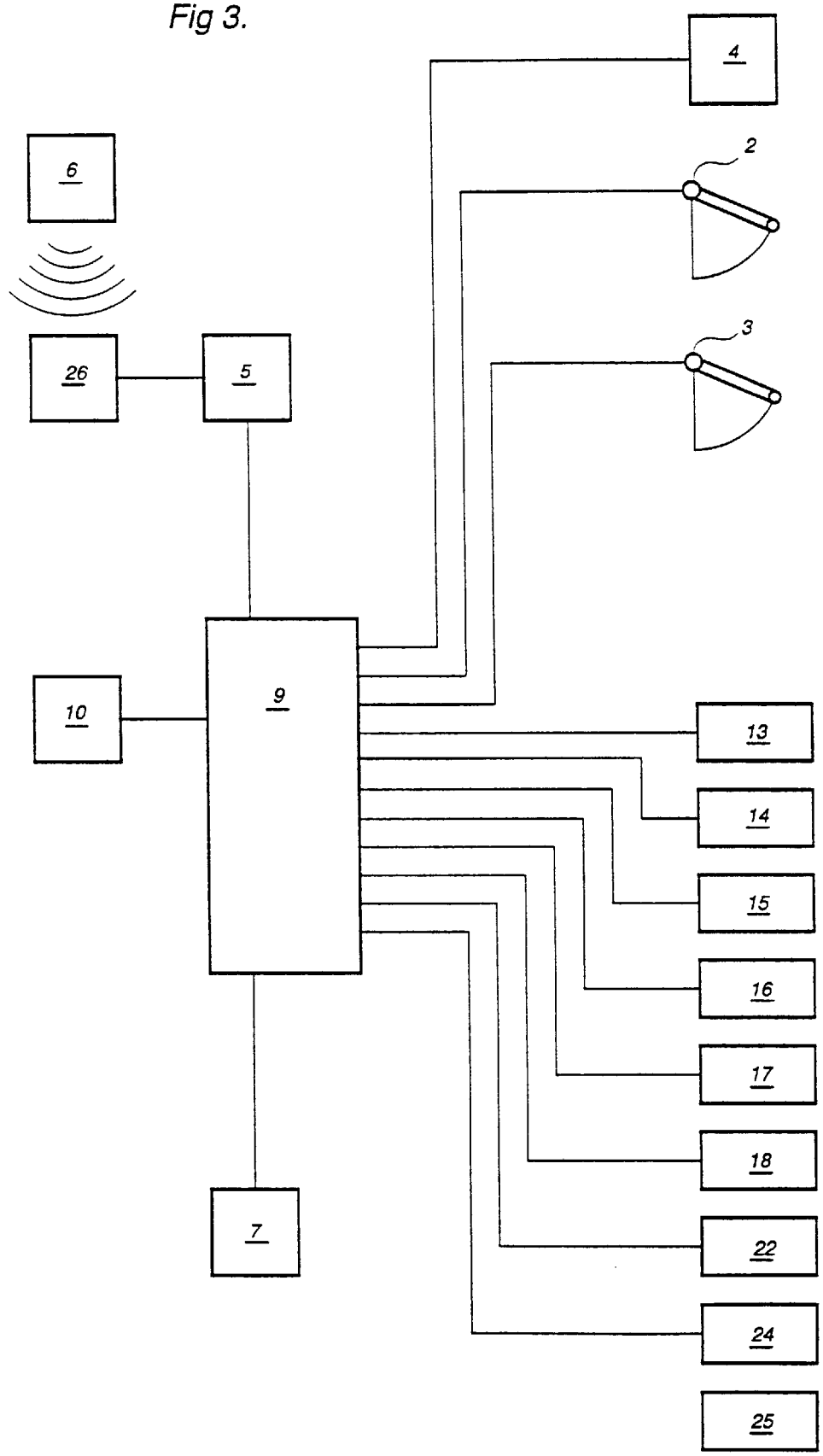
FIG. 3 shows a block diagram illustrating the different components of the milking station of FIG. 1.

FIG. 3 discloses schematically a diagram illustrating how the different components of the milking station are connected to each other. When an animal enters the milking stall 1, a signal from the transponder 6 is received by a receiver 26 sending it to the identification device 5. The identification of a specific animal is transmitted to the computer 9. When the animal has entered and is present in the milking stall 1, the entrance gate 2 and the exit gate 3 are automatically closed. Thereafter, the examination device 10 examines the condition of the udder and the teats with regard to how clean they are and if milking is needed. These facts together with the facts about the specific animal, which are already stored in the computer, are processed in the computer 9 to determine if the animal should be milked or if she is to leave the milking stall 1. If she should be milked, the automatic milking machine 7 is activated by the computer 9. After milking or when determined not to milk the animal, it should leave the milking stall 1 as soon as possible. To this end the computer 9 sends out signals to stop the feeding by the feeding device 4, to open automatically the exit gate 3, and to activate one or a combination of the enticing devices 13–25.

Figure 4A:
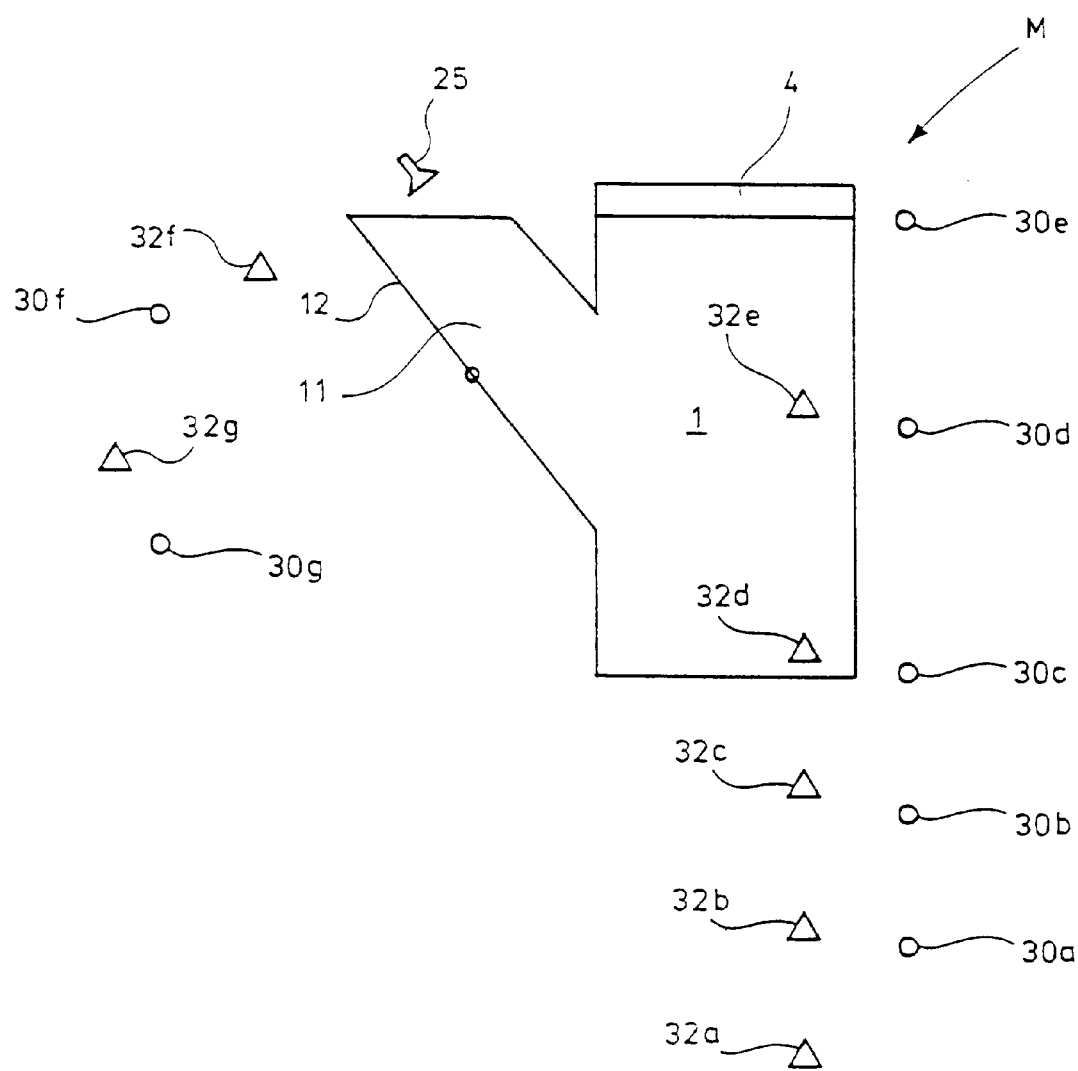
FIGS. 4A and 4B show schematically a milking station equipped with enticing means.
Figure 4B:
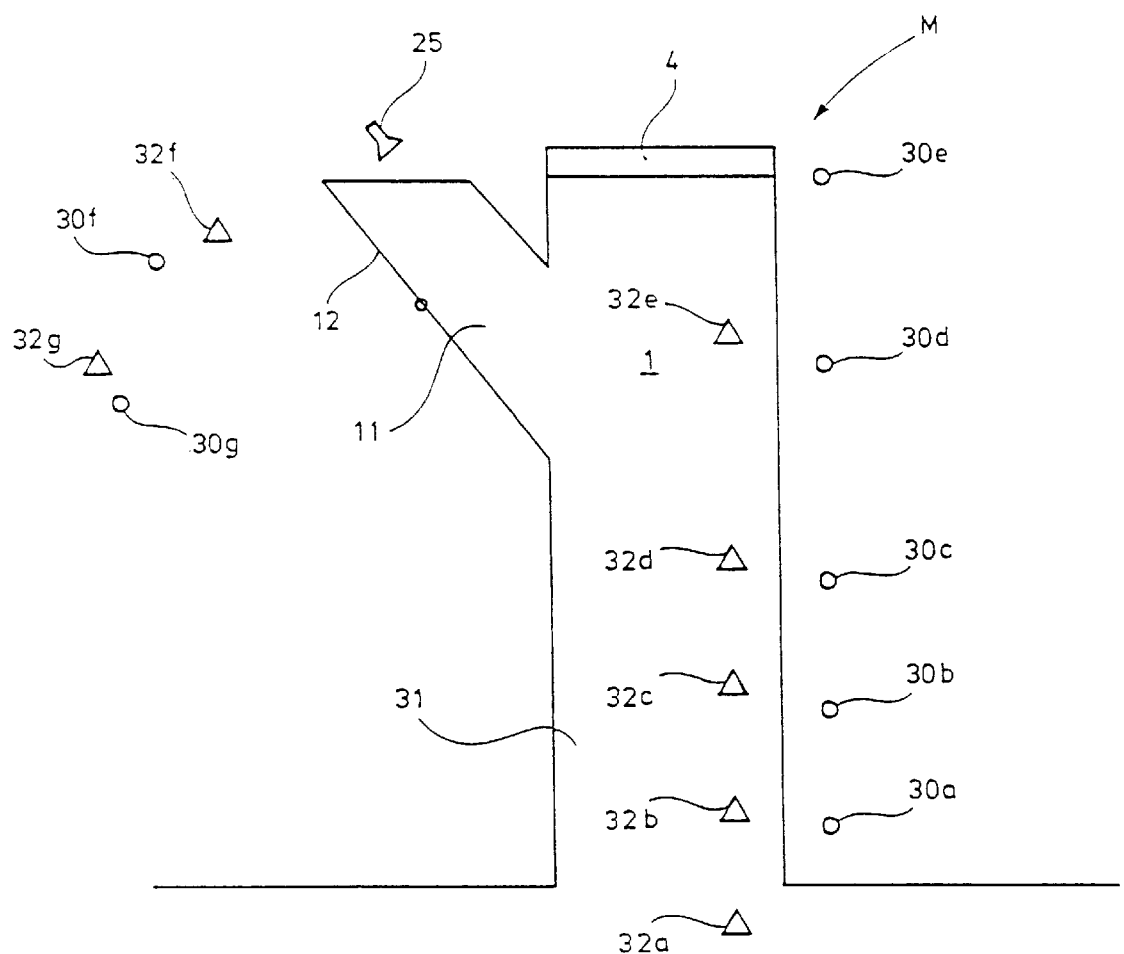

FIGS. 4A and 4B show schematically a milking station M equipped with enticing means 30a–30g in the form of loudspeakers, according to a first embodiment of the invention. The milking station M shown in FIG. 4B is furthermore comprised with a corridor or pathway 31, which the animal must enter in order to reach the milking stall 1.

When an animal residing in the vicinity of the milking station M and identified by a sensing device, e.g. 32a, is considered to need to be milked, it should as quickly as possible move towards a predetermined destination, i.e. the milking station M, without causing the animal pain or discomfort. For this purpose, an enticing sound is generated by a loudspeaker 30a. When the animal approaches the loudspeaker 30a, after the animal has been identified by a sensing device 32a in the vicinity of the loudspeaker 30a, an enticing sound is instead generated by loudspeaker 30b. The procedure is repeated regarding the sensing means 32b–d and the loudspeakers 30c, 30d and 30e until the animal has taken its place in the milking stall 1 of the milking station M. As a reward, the animal is given feed in the feeding device 4.

The enticing sound may be any sound that entices the animal to move towards the milking station M, e.g. the sound of feed falling down into a feed trough or the sound of water splashing into a bowl.

When the animal has been milked, it is important that the animal immediately leaves the milking stall 1, so that another animal can be milked. As described above, a loudspeaker 25 may be arranged in connection with the treatment stall 11 to entice the animal to leave the milking station M. It is also important that the animal leaves the treatment stall 11 within a reasonable period of time. For this purpose, loudspeakers 30f and 30g are arranged at a suitable distance from the treatment stall in order to entice the animal to leave the treatment stall. Thereby, the loudspeaker 30f generates an enticing sound responsive to a signal from the sensing means 32f or to a signal from a sensor that senses when the exit gate 12 is open. When the animal approaches the loudspeaker 30f and the sensor 32g senses the cow's transponder, an enticing sound is generated in loudspeaker 30g.

Preferably, the animal receives a reward in the form of feed or water when it is no longer blocking the exit gate 12 of the treatment stall 11. Accordingly, in this case, the predetermined destination is somewhere outside the milking station M.

Although the number of loudspeakers has been shown in FIGS. 4A and 4B to be five to entice the animal to move towards the milking station M, it is obvious that a lower number of loudspeakers such as two, three or four would be sufficient to perform the invention. The number could as well be more than five, depending on the distance the animal is to be enticed to cover.

In the same way, the number of loudspeakers to entice the animal to leave the treatment stall may be less than two, i.e. one, or more than two.

Of course, loudspeakers 30f and 30g may be arranged directly outside the milking station M to entice the animal to move away from the milking station M without passing the treatment stall, if no treatment after finished milking is considered to be needed. This is also the case in milking stations not being provided with a treatment stall. Furthermore, the enticing of the animal may start anywhere along the route to the destination, i.e. it is not necessary to start the route at the enticing unit 30a.

The use of loudspeakers for encouraging an animal to leave a milking parlour by producing unpleasant sounds, e.g. shrill sounds or to produce a sound pleasant to the animal for promoting milk production is known from EP-B-0 189 954.

The use of one single fixed loudspeaker or a loudspeaker arranged in a collar around the neck of the cow for luring or frightening her is known from EP-B-0 332 231.

The sensing devices 32a–c are preferably reading devices that can identify an animal based on a signal generated by the transponder, whereas the sensors 32d–g are preferably inexpensive sensor devices, like infrared sensors, weight sensors, light relays or the like, rather than expensive reading devices, even though it would certainly be possible to use the latter. The use of inexpensive sensor devices is particularly suitable in the pathway 31, where the animal has already been identified before entering the pathway.

According to a second embodiment of the invention, the enticing means 30a–30g and 25 shown in FIGS. 4A and 4B comprises light sources, preferably illuminating lamps or spotlights. Thereby, the spotlights either illuminate a part of the pathway 31 or the milking stall 1 or feed placed in feed troughs or the like. It may be useful to dark surrounding parts of the area to be illuminated by the spotlights or lamps.

According to a third embodiment of the invention, the enticing units 30a–30g comprise feed supply devices, such as feed troughs.

According to a fourth embodiment of the invention, the enticing units 30a–30g comprise water supply devices, such as water bowls for supplying fresh drinking water.

According to a fifth embodiment of the invention, the enticing units 30a–30g comprise smell generating devices for spreading smelling substances attractive to the animal.

Figure 5A:
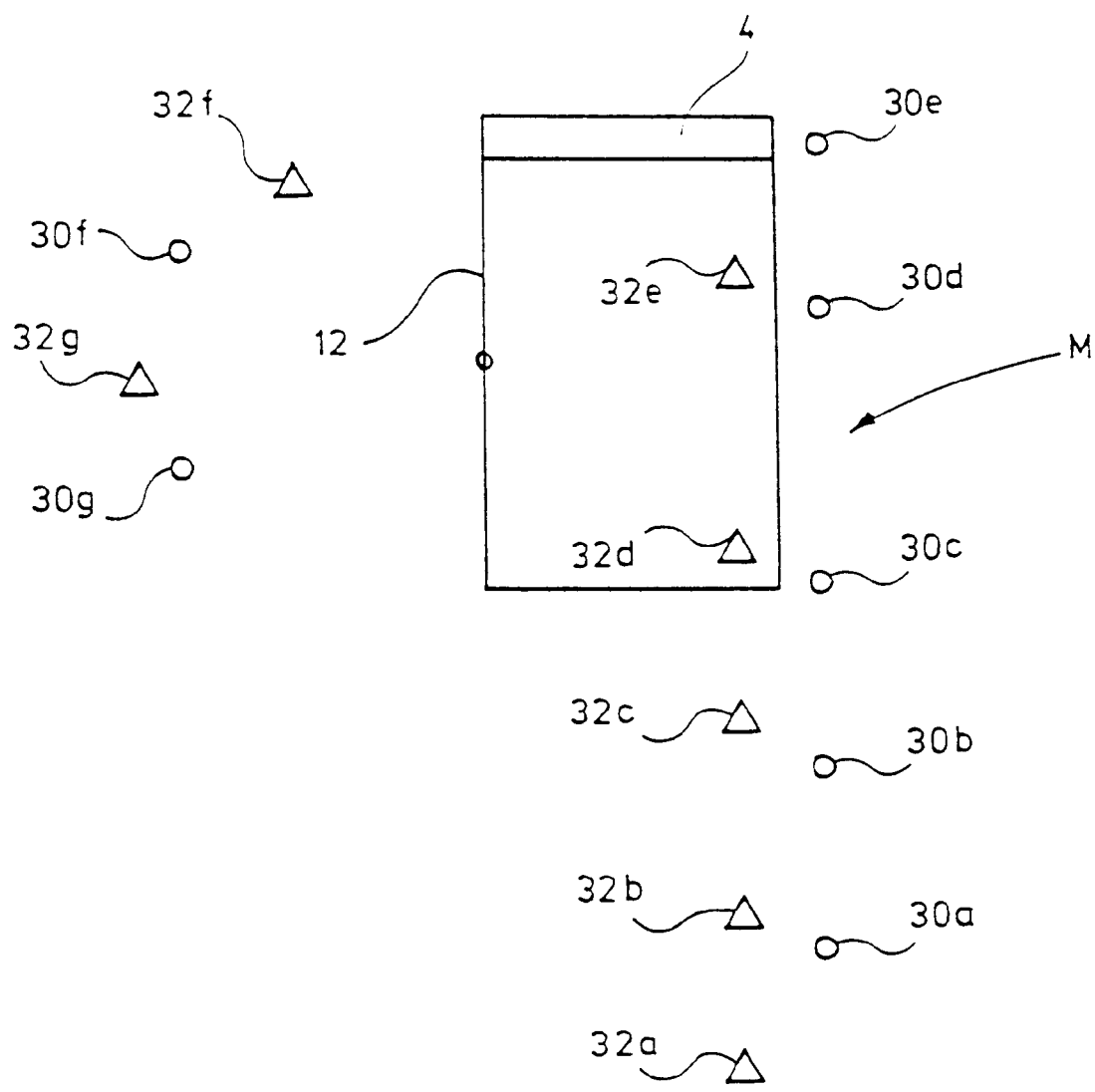
FIGS. 5A and 5B show schematically a treatment stall equipped with enticing means.
Figure 5B:
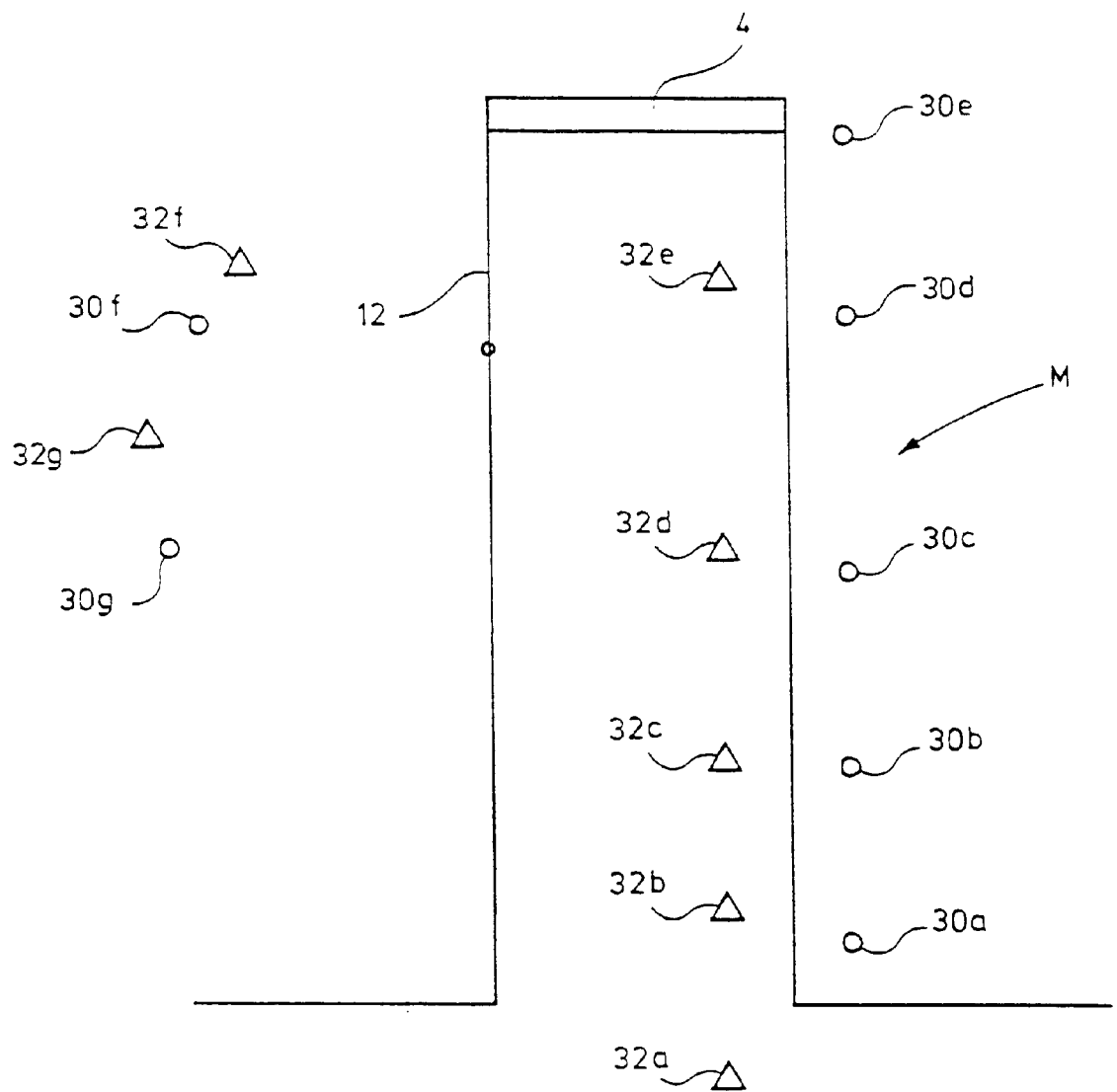

As shown in FIGS. 5A and B, enticing means 30a–30g may be used for enticing the animal to take a predetermined route, which leads to a milking station M without a treatment stall. The destination may also be a treatment stall, which is not connected to a milking stall at all, but serves only to treat the animals. Another destination may be a calving stall, a paring stall or the like.

It is to be understood that each of said enticing units according to the different embodiments may be used in combination with anyone or several of the others.

Alternatively, the stall 1 may comprise pretreatment equipment, such as massageing means, teat cleaning means etc., and the additional stall 11 may comprise a milking machine, e.g. a robot, instead of the treatment equipment disclosed. Hereby, the enticing means may be provided to entice the animal to enter the stall 1, to continue to the additional stall 11 and to leave the additional stall 11.

Figure 6A:
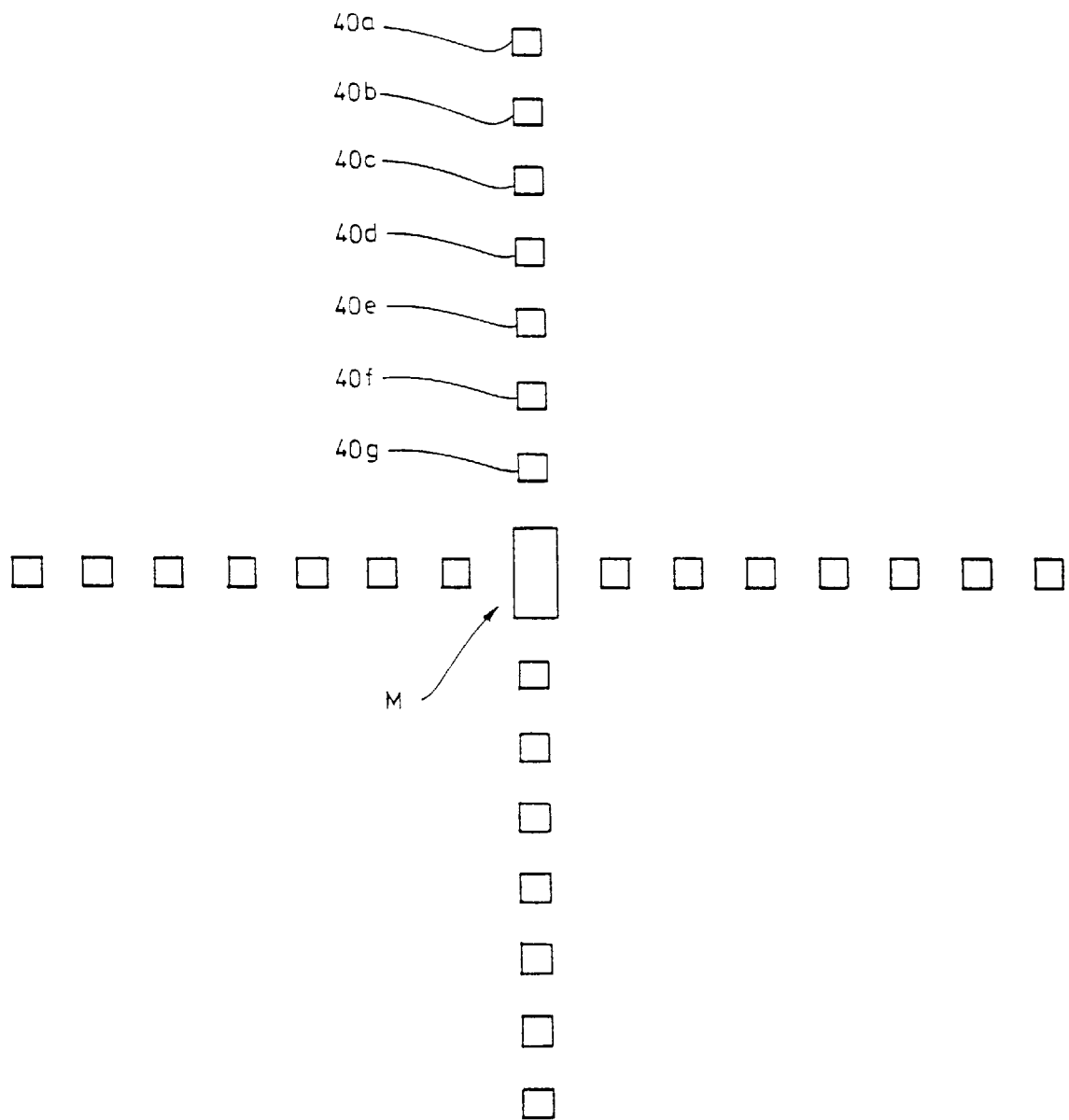
FIGS. 6A and 6B show schematically two possibilities of arranging supply units in relation to the milking station.
Figure 6B:
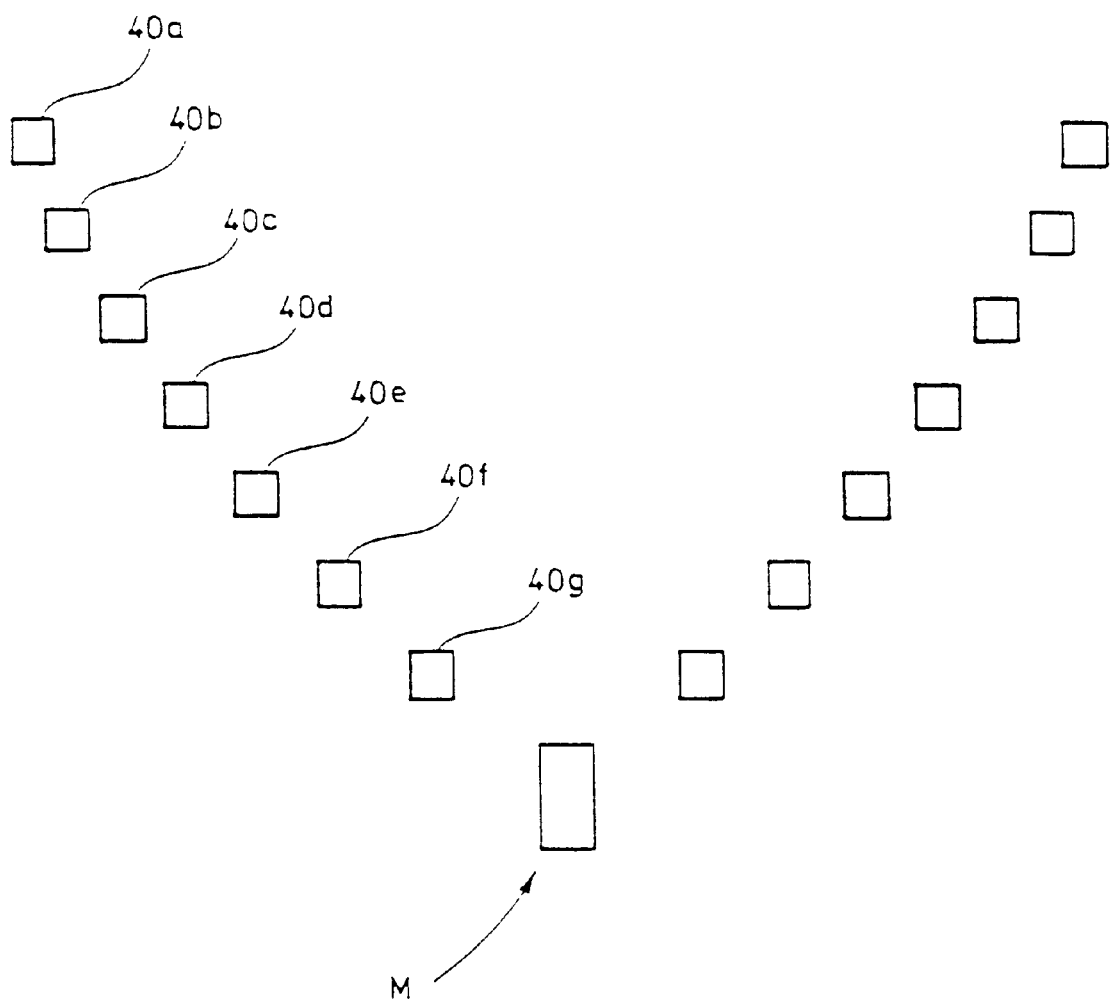

FIGS. 6A and 6B illustrate schematically possibilities of arranging supply units 40a–40g in relation to a milking station M. The supply units 40a–40g are, according to a first embodiment, of the same kind as the supply means 13 (see FIG. 1) provided with a feed supply device 13a and a water supply device 14 and a sensing means preferably comprising a receiver 26 as described above.

Preferably, the supply units 40a–40g are placed with a particular distance from each other. It should not be too short since the animals may get confused and the enticing effect may get lost. It should not be too long either, since the animals may be unwilling to move further, however strong the enticing effect may be, because instinctively animals stay to their flock.

Still, the distance between different supply units 40a–40g need not be constant. Moreover, the arrangements shown in FIGS. 6A and 6B are only examples of suitable configurations of the supply units 40a–40g in relation to the milking station M. It should therefore be noted that the number of supply units 40a–40g may vary from only one to many, depending on how many animals that should be served by the milking station M. Another factor is the size of the area where the milking station M is placed; the larger the area and the larger the distance from a remote supply unit, the larger the need for several supply units. The supply units may also be placed to take any suitable form. Moreover, the number of milking stations M may be more than one.

According to the invention, edible products, such as feed or water is used to entice the animal firstly to find its way to the milking station M in order to move to said milking station and secondly, to move away from the milking station after finished milking. In the first case, the milking station M is regarded a destination for the animals towards which they move, whereas in the second case, it is regarded a restricted area for the animals to reside.

According to the invention, feed or water is dispensed to animals to go to said milking station M with a relatively low dispensing intensity, i.e. in relatively small amounts or even not at all in the supply units 40a–40d that are placed relatively remote from the milking station M. This will entice the animal to look for feed or water in the supply units 40e–40g situated closer to the milking station M. In these supply units feed will be dispensed with a relatively high dispensing intensity. After a while, the procedure will be repeated; there will be little or no feed or water in the supply units 40e and 40f, whereas there will be feed or water in the supply units 40g and, of course, in the feeding device 4 located in the milking station M.

If an animal resides too closely to the milking station M when it is not allowed to, e.g. after milking, feed or water is dispensed with a relatively low dispensing intensity, i.e. in relatively small amounts or not at all in supply units 40d–40g relatively close to the milking station M. This will entice the animal to seek for feed or water in supply units 40a–40c farther away from the milking station M, where feed will be dispensed with a relatively high dispensing intensity.

It should be noted that feed or water is not dispensed by the supply units until the animal has been identified and the control means 9 has produced a signal to allow the animal to be fed.

If several supply units 40a–40g are provided, the amount of feed supplied therein may vary increasingly or decreasingly as a function of the distance from an individual supply unit to the milking station M. The variation may be linear or exponential.

It should be noted that the above mentioned low and high dispensing intensity, respectively, may be achieved by controlling the supply units to dispense the edible products with a low or a high speed, respectively, instead of or in combination with small or large rations.

Figure 7:
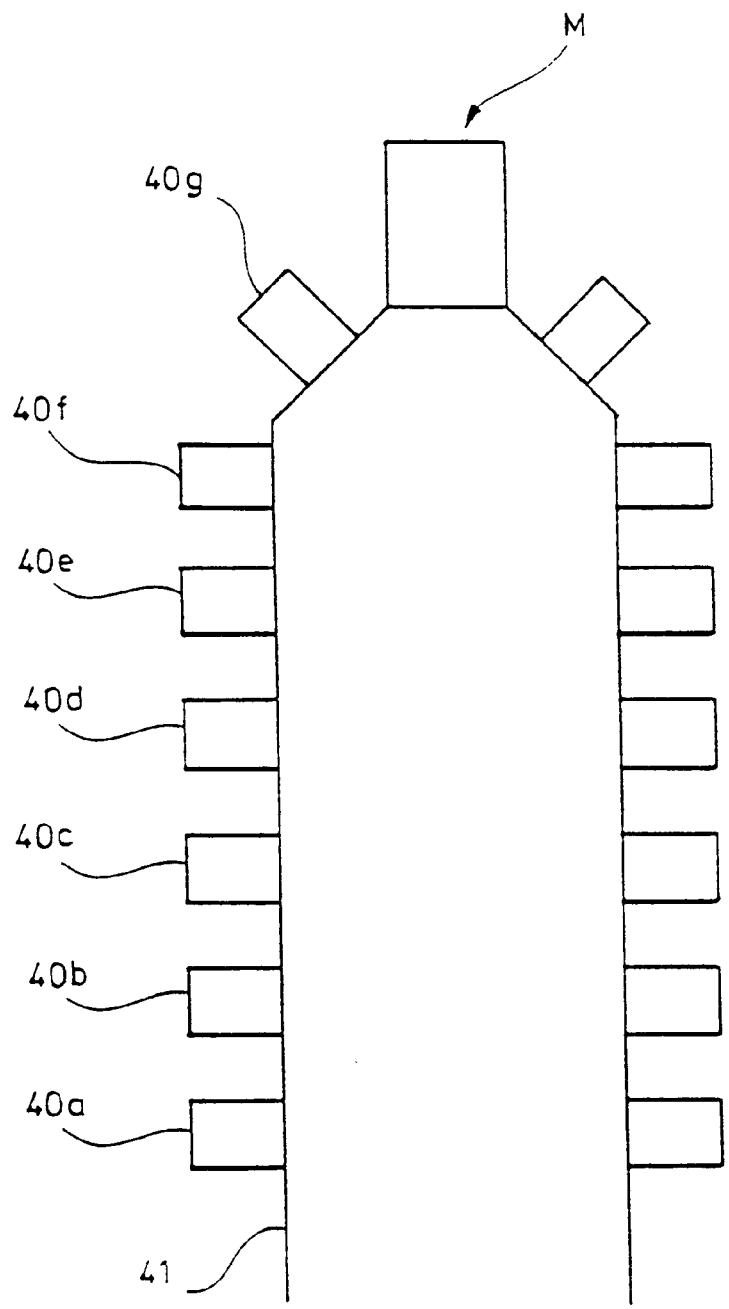
FIG. 7 shows a further possibility of arranging supply units in relation to the milking station.

FIG. 7 illustrates an alternative embodiment of the invention, where the supply units 40a–40g comprise a number of feed troughs placed beside each other. The feed troughs may be filled with water, concentrated is food or roughage, i.e. hay or silage.

Each feed trough is provided with an entrance gate either for the whole animal or for just the head of the animal. The gate is opened by means of a control means responsive to a signal from a transponder, which identifies the animal. Preferably, but not necessarily, the feeding troughs are arranged at a common wall 41. Accordingly, an animal, which is to be milked in a milking stall 1, is not allowed entry to feed troughs far away from the milking station M, but to feed troughs close to the milking station M, in a similar manner as described above in connection with FIGS. 4A and 4B.

The feed troughs may be of the kind disclosed in SE-A-9400741-6, which furthermore comprises weighing means for weighing either the amount of feed given to each animal or the feed eaten by each animal.

It should be noted that the said destination and the said restricted area, respectively, do not necessarily need to be a milking station. Instead, it may also be a calving stall, a treatment stall, a roughage table, a paring stall or any other place towards which the animal is to move or leave.

Furthermore, the invention may also be used for enticing animals to move to or return from pasture.

Additionally, the invention may be used for grouping animals of different categories together, e.g. cows being in different stages of lactation.

Wherever the expression "animal" has been used above in connection with the milking station disclosed above, it is to be understood that any animal, which can be milked, is meant, such as cows, sheep, goats, buffaloes and horses.

In other cases any kind of animal is meant.

As mentioned above, the invention may also be used in other applications than milking stations. Accordingly, the invention may also be used for animals in general, which are to be monitored.

It should also be noted that sensing means in the form of a transponder 6 to be sensed by a receiver 26 is not necessary in cases where only one of few animals are to be monitored. This may be the case where animals have been separated from the herd because of illness or pregnancy. In this case, sensing means in the form of sensing devices that senses the presence of the animal, such as infrared sensors or light relays, may be used instead.

We claim:

1. An apparatus for managing an animal, comprising:
   a stall having an entrance and an exit and provided for housing one single animal;
   an exit area accessible to the animal from the exit of the stall;
   enticing means provided to entice the animal to move from the stall into the exit area,
      wherein the enticing means is activatable from a rest state in which it does not entice the animal to an activated state in which it entices the animal, the enticing means including a plurality of enticing devices; and
   control means for activating the enticing means, wherein the control means is provided for selectively activating any one or a combination of the enticing devices.

2. An apparatus according to claim 1, wherein an identifying means is provided for identifying the animal entering the stall, and in that the control means is arranged to activate selectively any one of or a combination of the enticing devices in accordance with the preferences of the animal identified by the identifying means.

3. An apparatus according to claim 1, wherein the enticing devices comprise a device provided in the exit area for supplying water to the animal.

4. An apparatus according to claim 1, wherein the enticing devices comprise a feeding device provided in the exit area.

5. An apparatus according to claim 4, wherein the feeding device comprises a manger and a dispenser for dispensing feed into a manger of the feeding device in such a way that a sound which is recognizable by the animal is generated.

6. An apparatus according to claim 1, wherein the enticing devices comprise a cleaning device provided in the exit area.

7. An apparatus according to claim 6, wherein the animal has an udder and teats, and the cleaning device comprises means for spraying warm water on the udder and the teats of the animal.

8. An apparatus according to claim 6, wherein the animal has an udder and teats, and the cleaning device comprises means for mechanically cleaning the udder and teats of the animal.

9. An apparatus according to claim 1, wherein the enticing devices comprise a device provided in the exit area for spraying warm air on the udder and teats of the animal.

10. An apparatus according to claim 1, wherein the enticing devices comprise a dressing device provided in the exit area.

11. An apparatus according to claim 10, wherein the dressing device comprises a rotating brush.

12. An apparatus according to claim 1, wherein the enticing devices comprise a device provided in the exit area for spreading smelling substances.

13. An apparatus according to claim 1, wherein the enticing devices comprise a sound generating device provided in the exit area which generates a sound which is agreeable to the animal.

14. An apparatus according to claim 1, wherein the animal has an udder and teats, the apparatus further including an examination device provided in the stall for determining the animal's need for milking and the cleanliness of the animal's udder and the teats.

15. An apparatus according to claim 1, wherein the entrance and the exit of the stall are provided with respective gates, which are arranged to open and close the exit and the entrance by means of the control means.

16. An apparatus according to claim 15, wherein the exit gate of the stall constitutes an inlet gate to the exit area.

17. An apparatus according to claim 1, wherein the exit area is defined by an additional stall.

18. An apparatus according to claim 17, wherein the additional stall is provided with an exit gate which is openable by the animal.

19. An apparatus according to claim 1, including milking means for automatic milking of an animal present in the stall.

20. A method of automatically managing an animal in a stall, comprising the following steps:

electronically identifying the individual animal entering the stall;

examining the condition of the identified animal;

treating the identified animal in response to the result from the condition examination, and activating an enticing means for enticing the animal away from the stall.

21. A method according to claim 20, wherein the enticing step comprises physically making the animal aware of the existence of the enticing means.

22. A method according to claim 20, wherein the animal is enticed away from the stall by a sound generated when dispensing food into a manger outside the milking area.

23. A method according to claim 20, wherein the animal is enticed away from the stall by a sound generated when pouring water.

24. A method according to claim 20, wherein the animal is enticed away from the stall by recognizing the possibility of being cleaned.

25. A method according to claim 20, wherein the animal is enticed away from the stall by recognizing the possibility of being dressed by means of a rotating brush.

26. A method according to claim 20, wherein the animal is enticed away from the stall by an agreeable musical sound.

27. A method according to claim 20, wherein the animal is enticed away from the stall by smelling substances.

28. A method according to claim 20, wherein the stall defines a milking area and that milking means is provided for automatic milking of the animal present in the stall.

29. An apparatus for enticing an animal towards a predetermined destination, comprising an animal enticing means, said animal enticing means including:

a plurality of enticing units arranged at different locations and activatable independently of one another, a sensing means for sensing the presence of the animal comprising a plurality of sensing devices in an area where the animal resides, wherein at least one sensing device of said plurality of sensing devices upon sensing the presence of the animal activates at least one of said plurality of said enticing units for enticing the animal to move towards said one of said enticing units, thereby leading the animal along a route to said destination.

30. An apparatus according to claim 29, wherein a second one of said plurality of sensing devices, located on said route closer to said predetermined destination then said one sensing device, activates a second one of said enticing units located on said route closer to said predetermined destination than said one enticing unit.

31. An apparatus according to claim 29, wherein said enticing unit is a smell generating device.

32. An apparatus according to claim 29, wherein said enticing unit is a water supply device.

33. An apparatus according to claim 29, wherein said enticing unit is a feed supply device.

34. An apparatus according to claim 29, wherein said enticing unit is a light emitting device.

35. An apparatus according to claim 29, wherein said enticing unit is a sound generating device.

36. An apparatus according to claim 29, wherein the enticing unit is positioned for activation substantially in front of the animal, seen in the direction of movement of the animal.

37. An apparatus according to claim 29, wherein said predetermined destination is a milking station.

38. An apparatus according to claim 29, further comprising a milking station, said predetermined destination being outside said milking station.

39. An apparatus according to claim 29, wherein said predetermined destination is a treatment stall.

40. An apparatus according to claim 29, further comprising a treatment stall, said predetermined destination being outside said treatment stall.

41. An apparatus according to claim 29, further comprising a pathway defined by side movement delimiting means.

42. An apparatus according to claim 29, wherein said sensing means comprises an identification means to be associated with the animal and a reading means responsive to a signal from said identification means.

43. An apparatus for enticing an animal of a herd to move in a desired direction comprising a plurality of supply units for dispensing edible products to the animal, said supply units being arranged at different locations along said direction, each supply unit being provided with a sensing means for sensing the presence of said animal, and control means for controlling the supply units in response to said sensing means sensing the presence of the animal to dispense the edible products with varying dispensing intensity to the animal in various supply units, such that the animal is enticed to seek for edible products in said desired direction.

44. An apparatus according to claim 43, wherein said direction leads to a predetermined destination, said supply units being arranged at difference distances from said destination, said control means controlling the dispensing intensity such that the edible products are dispensed in a relatively low dispensing intensity to the animal by a first group of supply units located relatively remote from the destination, in order to entice the animal to seek for edible products dispensed by a second group of supply units closer to said destination.

45. An apparatus according to claim 44, wherein said control means is adapted to control the dispensing intensity such that edible products are dispensed to the animal with a relatively high intensity by the second group of supply units located relatively close to said destination.

46. An apparatus according to claim 44, wherein said control means controls the supply units such that the relative dispensing intensity of the supply units increases with decreasing distance between successive ones of said plurality of supply units along said direction and said destination.

47. An apparatus according to claim 44, wherein said destination is a milking station.

48. An apparatus according to claim 46, wherein said direction leads away from a restricted area, said supply units being arranged at different differences from said restricted area including a first group of supply units positioned relatively close to the restricted area and a second group of supply units positioned relatively remotely from said restricted area, said control means controlling the dispensing intensity such that edible products are not dispensed at all or are dispensed with relatively low intensity by said first group of supply units located relatively close to the restricted area in order to entice the animal to seek for edible products dispensed by said second group of supply units farther away from said restricted area.

49. An apparatus according to claim 48, wherein said control means controls the dispensing intensity such that edible products are dispensed to the animal with a relatively high intensity by the second group of supply units located relatively remote from said restricted area.

50. An apparatus according to claim 48, wherein said control means controls the supply units such that the relative dispensing intensity of the supply units increases with increasing distance between successive ones of said plurality of supply means unit and said restricted area.

51. An apparatus according to claim 48, wherein said restricted area is a milking station.

52. An apparatus according to claim 43, wherein each supply unit dispenses rations of the edible products of different size, such that a small ration corresponds to a low dispensing intensity whereas a large ration corresponds to a high dispensing intensity.

53. An apparatus according to claim 43, wherein each supply unit dispenses the edible products with different speeds, such that a small dispensing speed corresponds to a low dispensing intensity, and a high dispensing speed corresponds to a high dispensing intensity.

54. An apparatus according to claim 43, wherein each supply unit comprises at least one feed supply device, and said edible product comprises feed.

55. An apparatus according to claim 43, wherein each supply unit comprises at least one water supply device, and said edible product comprises water.

56. An apparatus according to claim 43, wherein said sensing means comprises a reading means responsive to an identification means for association with each animal for the identification thereof.

57. A method of enticing an animal to move in a desired direction, comprising the steps of:

dispensing edible products, such as feed or water to the animal in supply units at different locations along said direction;

sensing the presence of the animal at said supply units; and controlling said supply units in response to sensed presence of the animal, such that the edible products are dispensed with varying intensity to the animal in various ones of said supply units to entice the animal to seek for edible products in said desired direction.

* * * * *